United States Patent
Li et al.

(10) Patent No.: US 12,536,819 B2
(45) Date of Patent: Jan. 27, 2026

(54) REAL-TIME SCENE TEXT AREA DETECTION

(71) Applicant: INNOPEAK TECHNOLOGY, INC., Palo Alto, CA (US)

(72) Inventors: Jiachen Li, Palo Alto, CA (US); Rongrong Liu, Palo Alto, CA (US); Yuan Lin, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 344 days.

(21) Appl. No.: 18/307,788

(22) Filed: Apr. 26, 2023

(65) Prior Publication Data
US 2024/0087344 A1    Mar. 14, 2024

Related U.S. Application Data

(63) Continuation of application No. PCT/US2021/055157, filed on Oct. 15, 2021.
(Continued)

(51) Int. Cl.
*G06K 9/00* (2022.01)
*G06V 20/62* (2022.01)
*G06V 30/19* (2022.01)

(52) U.S. Cl.
CPC ........ *G06V 20/63* (2022.01); *G06V 30/19147* (2022.01)

(58) Field of Classification Search
CPC ........ G16H 30/20; G16H 30/40; G16H 50/20; G16H 10/20; G06T 11/008; G06T 2211/404; G06T 2207/10016; G06T 7/0012–0016; G06T 2207/10064–10136; G06T 2207/30004–30104; G06T 7/30–38; G06T 7/70–77; A61B 6/032;
(Continued)

(56) References Cited

U.S. PATENT DOCUMENTS

2015/0161170 A1    6/2015  Yee et al.
2019/0130204 A1*   5/2019  Li .................... G06V 30/18143
(Continued)

OTHER PUBLICATIONS

M. Cao, Y. Zou, D. Yang and C. Liu, "GISCA: Gradient-Inductive Segmentation Network With Contextual Attention for Scene Text Detection," in IEEE Access, vol. 7, pp. 62805-62816, 2019, doi: 10.1109/ACCESS.2019.2915513. (Year: 2019).*
(Continued)

*Primary Examiner* — Atiba O Fitzpatrick
(74) *Attorney, Agent, or Firm* — Hodgson Russ LLP

(57) ABSTRACT

A computer system obtains the image including one or more text areas, and generates a sequence of feature maps from the image based on a downsampling rate. Each feature map has a first dimension and a second dimension, and the feature maps include a first feature map and a second feature map. Each of the first and second dimensions of the first feature map has a respective size that is reduced to that of a respective dimension of the second feature map by the downsampling rate. The second feature map is upsampled by an upsampling rate using a local context-aware upsampling network. The upsampled second feature map is aggregated with the first feature map to generate an aggregated first feature map. The one or more text areas are identified in the image based on the aggregated first feature map.

20 Claims, 10 Drawing Sheets

Related U.S. Application Data

(60) Provisional application No. 63/110,876, filed on Nov. 6, 2020.

(58) Field of Classification Search
CPC ................ A61B 6/5235; A61B 6/5247; G06V 2201/03–034; G06V 10/24–248; G06V 10/75–761
See application file for complete search history.

(56) References Cited

U.S. PATENT DOCUMENTS

| | | |
|---|---|---|
| 2019/0272438 A1 | 9/2019 | Liu et al. |
| 2019/0385054 A1 | 12/2019 | Zuev et al. |
| 2020/0065942 A1 | 2/2020 | Hiasa |
| 2020/0084427 A1* | 3/2020 | Sun ........................ G06N 3/045 |
| 2021/0357674 A1* | 11/2021 | Ogawa ................... G06V 20/62 |
| 2022/0004744 A1* | 1/2022 | Xiang .................... G06V 40/23 |

OTHER PUBLICATIONS

Li et al., "Shape robust text detection with progressive scale expansion network," arXiv:1806.02559v1, 2018.

Liao et al., "Real-Time Scene Text Detection with Differentiable Binarization," Proceedings of The Thirty-Fourth AAAI Conference on Artificial Intelligence, 2020.

Wang et al., "Efficient and accurate arbitrary-shaped text detection with pixel aggregation network," Proceedings of the IEEE/CVF International Conference on Computer Vision, 2019.

WIPO, International Search Report and Written Opinion for International Application No. PCT/US2021/055157, Jan. 25, 2022.

\* cited by examiner

REAL-TIME SCENE TEXT AREA DETECTION

CROSS-REFERENCE TO RELATED APPLICATION(S)

This application is a continuation of International Application No. PCT/US2021/055157, filed Oct. 15, 2021, which claims priority to U.S. Provisional Patent Application No. 63/110,876, filed Nov. 6, 2020, the entire disclosures of which are incorporated herein by reference.

TECHNICAL FIELD

This application relates generally to image data processing technology including, but not limited to, methods, systems, and non-transitory computer-readable media for detecting one or more text areas in an image.

BACKGROUND

Deep learning algorithms have been used to recognize and label typed, handwritten, or printed text contained in an image. Common convolution and pooling normally operate with fixed geometric structures, thereby limiting many deep learning models from learning spatial transformation of curved shapes of text instances. Label assignment rules are complicated and time-consuming when they are applied to recognize text areas having arbitrary shapes. Different parts of text (e.g., heads, tails, and boundaries) are required to be labeled as different classes, and text regions are scaled down with a fixed ratio during a training process. Such a training process demands hand-crafted parameters with grid search on different benchmarks to provide state-of-the-art performances of the deep learning models. It would be beneficial to have an efficient deep learning method to recognize text areas in an image than the current practice.

SUMMARY

In one aspect, a method for identifying text areas in an image is provided. The method includes obtaining the image including one or more text areas, and each text area includes textual content. The method includes generating a first sequence of feature maps from the image based on a downsampling rate. Each feature map has a first dimension, a second dimension, and a third dimension. The first sequence of feature maps include a first feature map and a second feature map, and each of the first and second dimensions of the first feature map has a respective size that is reduced to that of a respective dimension of the second feature map by the downsampling rate. The method further includes upsampling the second feature map by an upsampling rate using a local context-aware upsampling network, the upsampling rate matching the downsampling rate, aggregating the upsampled second feature map with the first feature map to generate an aggregated first feature map, and identifying the one or more text areas in the image based on the aggregated first feature map.

In another aspect, a method for identifying text areas in an image is provided. The method includes obtaining the image including one or more text areas, and each text area includes textual content. The method includes generating a first sequence of feature maps from the image based on a downsampling rate. Each feature map has two dimensions. The first sequence of feature maps includes a top feature map, one or more intermediate feature maps, and a first base feature map. Each of the two dimensions of the intermediate and first base feature maps has a respective size that is reduced to that of a respective dimension of an immediately-higher feature map by the downsampling rate. The method further includes successively from the top feature map and for each of the top and intermediate feature maps, upsampling the respective feature map by an upsampling rate using a local context-aware upsampling network, aggregating the upsampled respective feature map with a next feature map that is directly below the respective feature map to generate an aggregated next feature map, and updating the next feature map with the aggregated next feature map. The upsampling rate matches the downsampling rate. The method further includes identifying the one or more text areas in the image based on an updated feature map of the first base feature map.

In another aspect, a computer system includes one or more processors and memory having instructions stored thereon, which when executed by the one or more processors cause the processors to perform any of the above methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
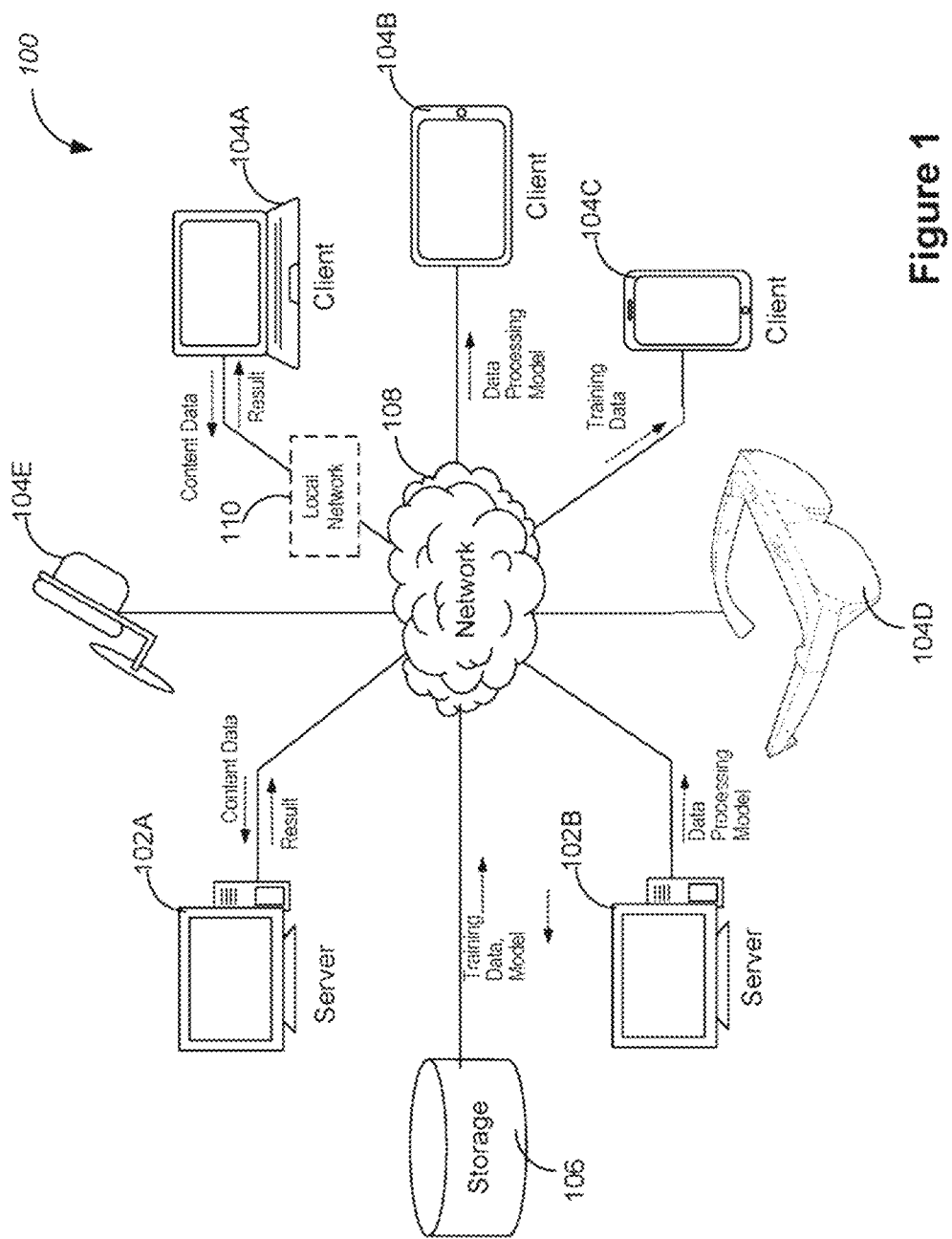
FIG. 1 is an example data processing environment having one or more servers communicatively coupled to one or more client devices, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Accordingly, there is a need for an efficient text area identification mechanism for identifying in an image one or more text areas from which textual content can be recognized in real time. Scene text detection is a type of text detection technique that aims to detect text instances in different scenes. This is a challenging task, because instances of scene text can be in different languages, colors, fonts, sizes, orientations, and shapes. Moreover, aspect ratios and layouts of scene text vary significantly, and backgrounds of natural scenes are virtually unpredictable. The quality of text images and videos could not be guaranteed and often suffer from poor quality. In order to solve the abovementioned challenges, a novel real-time segmentation-based model is applied to detect arbitrarily-shaped scene text with two novel techniques, local context-aware upsampling (LCAU) and dynamic text-spine labeling (DTSL). LCAU learns spatial transformation via local self-attention during an upsampling process, generates an attention weight matrix separately, and computes locally on feature maps during an upsampling process. These feature maps are light-weight, effective, and efficient compared to a global self-attention layer. DTSL simply shrinks text regions with a gradually increasing ratio among different training iterations and learns different representations for text without bringing additional computing burdens. LCAU and DTSL effectively enable a real-time inference speed for identifying text areas and recognizing textual content therein.

Various embodiments of this application address problems with segmentation-based deep learning models for arbitrary shaped scene text detection caused by lacking geometrical modeling and using complicated label assignments. A real-time segmentation-based model is applied to detect arbitrarily-shaped scene text in an image based on local context-aware upsampling (LCAU) and/or dynamic text-spine labeling (DTSL). LCAU and DTSL model local spatial transformation and simplify label assignments with dynamically increasing text-spine labels. Specifically, an image is captured by a camera and provided to a computer system configured to identify text areas and recognize textual content in these text areas in real time (e.g., with a latency less than 30 milliseconds). The image includes one or more text areas, and each text area includes textual content. The computer system generates a first sequence of feature maps from the image based on a downsampling rate. The first sequence of feature maps include a top feature map, one or more intermediate feature maps, and a first base feature map. Each feature map has two dimensions, and each of the two dimensions of the intermediate and base feature maps having a respective size that is reduced to that of a respective dimension of an immediately-higher feature map by the downsampling rate. Successively from the top feature map and for each of the top and intermediate feature maps, the computer system upsamples the respective feature map by an upsampling rate using an LCAU network, aggregates the upsampled respective feature map with a next feature map that is directly below the respective feature map to generate an aggregated next feature map, and updates the next feature map with the aggregated next feature map. The upsampling rate matches the downsampling rate. The one or more text areas are identified in the image based on an updated feature map of the first base feature map.

FIG. 1 is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, head-mounted display (HMD) (also called augmented reality (AR) glasses) 104D, or intelligent, multi-sensing, network-connected home devices (e.g., a surveillance camera 104E). Each client device 104 can collect data or user inputs, executes user applications, and present outputs on its user interface. The collected data or user inputs can be processed locally at the client device 104 and/or remotely by the server(s) 102. The one or more servers 102 provide system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. Further, in some embodiments, the one or more servers 102 can implement data processing tasks that cannot be or are preferably not completed locally by the client devices 104. For example, the client devices 104 include a game console (e.g., the HMD 104D) that executes an interactive online gaming application. The game console receives a user instruction and sends it to a game server 102 with user data. The game server 102 generates a stream of video data based on the user instruction and user data and providing the stream of video data for display on the game console and other client devices that are engaged in the same game session with the game console. In another example, the client devices 104 include a networked surveillance camera and a mobile phone 104C. The networked surveillance camera collects video data and streams the video data to a surveillance camera server 102 in real time. While the video data is optionally pre-processed on the surveillance camera, the surveillance camera server 102 processes the video data to identify motion or audio events in the video data and share information of these events with the mobile phone 104C, thereby allowing a user of the mobile phone 104 to monitor the events occurring near the networked surveillance camera in the real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some embodiments, deep learning techniques are applied in the data processing environment 100 to process content data (e.g., video data, visual data, audio data) obtained by an application executed at a client device 104 to identify information contained in the content data, match the content data with other data, categorize the content data, or synthesize related content data. The content data may broadly include inertial sensor data captured by inertial sensor(s) of a client device 104. In these deep learning techniques, data processing models are created based on one or more neural networks to process the content data. These data processing models are trained with training data before they are applied to process the content data. Subsequently to model training, the mobile phone 104C or HMD 104D obtains the content data (e.g., captures video data via an internal camera) and processes the content data using the data processing models locally.

In some embodiments, both model training and data processing are implemented locally at each individual client device 104 (e.g., the mobile phone 104C and HMD 104D). The client device 104 obtains the training data from the one or more servers 102 or storage 106 and applies the training data to train the data processing models. Alternatively, in some embodiments, both model training and data processing are implemented remotely at a server 102 (e.g., the server 102A) associated with a client device 104 (e.g., the client device 104A and HMD 104D). The server 102A obtains the training data from itself, another server 102 or the storage 106 and applies the training data to train the data processing models. The client device 104 obtains the content data, sends the content data to the server 102A (e.g., in an application) for data processing using the trained data processing models, receives data processing results (e.g., recognized or predicted device poses) from the server 102A, presents the results on a user interface (e.g., associated with the application), rending virtual objects in a field of view based on the poses, or implements some other functions based on the results. The client device 104 itself implements no or little data processing on the content data prior to sending them to the server 102A. Additionally, in some embodiments, data processing is implemented locally at a client device 104 (e.g., the client device 104B and HMD 104D), while model training is implemented remotely at a server 102 (e.g., the server 102B) associated with the client device 104. The server 102B obtains the training data from itself, another server 102 or the storage 106 and applies the training data to train the data processing models. The trained data processing models are optionally stored in the server 102B or storage 106. The client device 104 imports the trained data processing models from the server 102B or storage 106, processes the content data using the data processing models, and generates data processing results to be presented on a user interface or used to initiate some functions (e.g., rendering virtual objects based on device poses) locally.

In some embodiments, a pair of AR glasses 104D (also called an HMD) are communicatively coupled in the data processing environment 100. The AR glasses 104D can be includes a camera, a microphone, a speaker, one or more inertial sensors (e.g., gyroscope, accelerometer), and a display. The camera and microphone are configured to capture video and audio data from a scene of the AR glasses 104D, while the one or more inertial sensors are configured to capture inertial sensor data. In some situations, the camera captures hand gestures of a user wearing the AR glasses 104D. In some situations, the microphone records ambient sound, including user's voice commands. In some situations, both video or static visual data captured by the camera and the inertial sensor data measured by the one or more inertial sensors are applied to determine and predict device poses. The video, static image, audio, or inertial sensor data captured by the AR glasses 104D is processed by the AR glasses 104D, server(s) 102, or both to recognize the device poses. Optionally, deep learning techniques are applied by the server(s) 102 and AR glasses 104D jointly to recognize and predict the device poses. The device poses are used to control the AR glasses 104D itself or interact with an application (e.g., a gaming application) executed by the AR glasses 104D. In some embodiments, the display of the AR glasses 104D displays a user interface, and the recognized or predicted device poses are used to render or interact with user selectable display items (e.g., an avatar) on the user interface.

As explained above, in some embodiments, deep learning techniques are applied in the data processing environment 100 to process video data, static image data, or inertial sensor data captured by the AR glasses 104D. 2D or 3D device poses are recognized and predicted based on such video, static image, and/or inertial sensor data using a first data processing model. Visual content is optionally generated using a second data processing model. Training of the first and second data processing models is optionally implemented by the server 102 or AR glasses 104D. Inference of the device poses and visual content is implemented by each of the server 102 and AR glasses 104D independently or by both of the server 102 and AR glasses 104D jointly.

Figure 2:
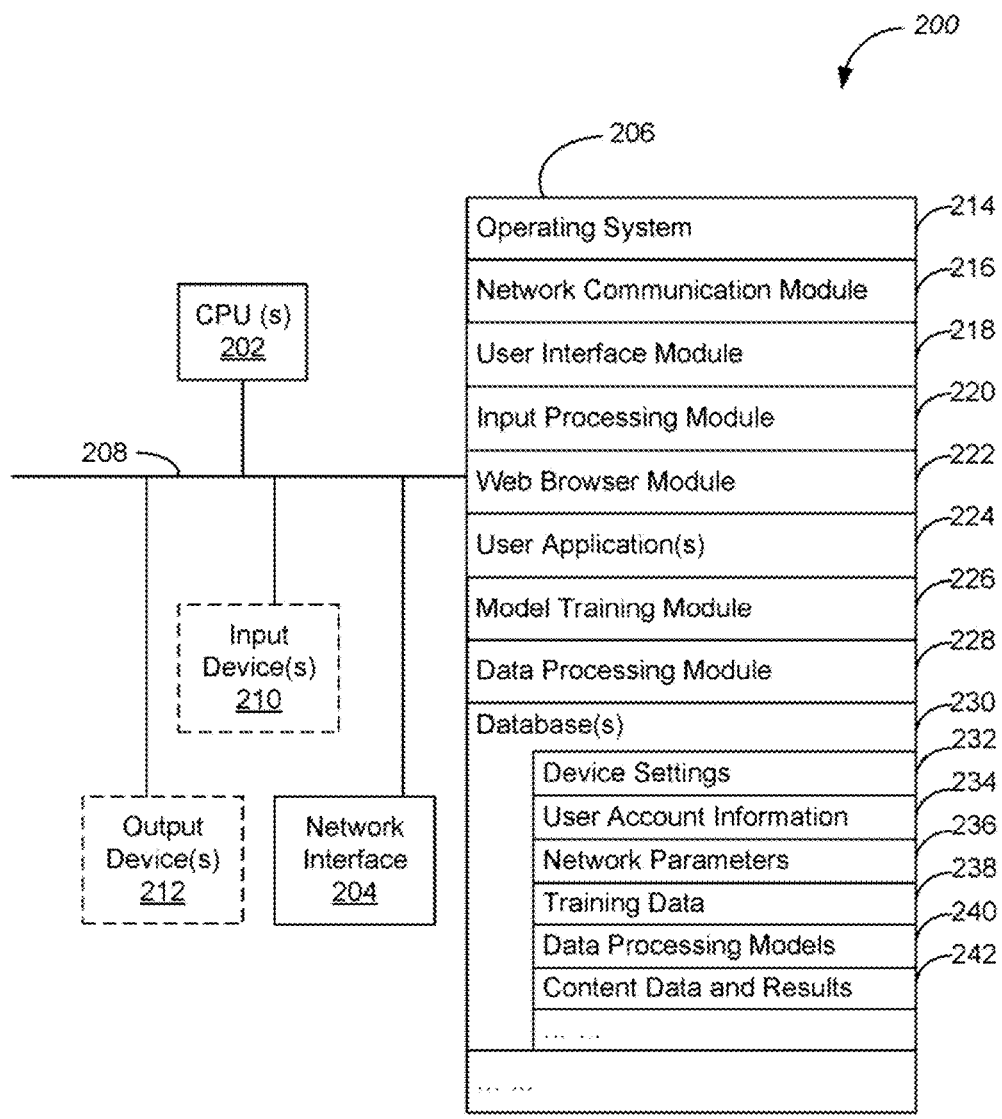
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104 (e.g., AR glasses 104D in FIG. 1), a storage 106, or a combination thereof. The data processing system 200, typically, includes one or more processing units (CPUs) 202, one or more network interfaces 204, memory 206, and one or more communication buses 208 for interconnecting these components (sometimes called a chipset).

The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Figure 5:
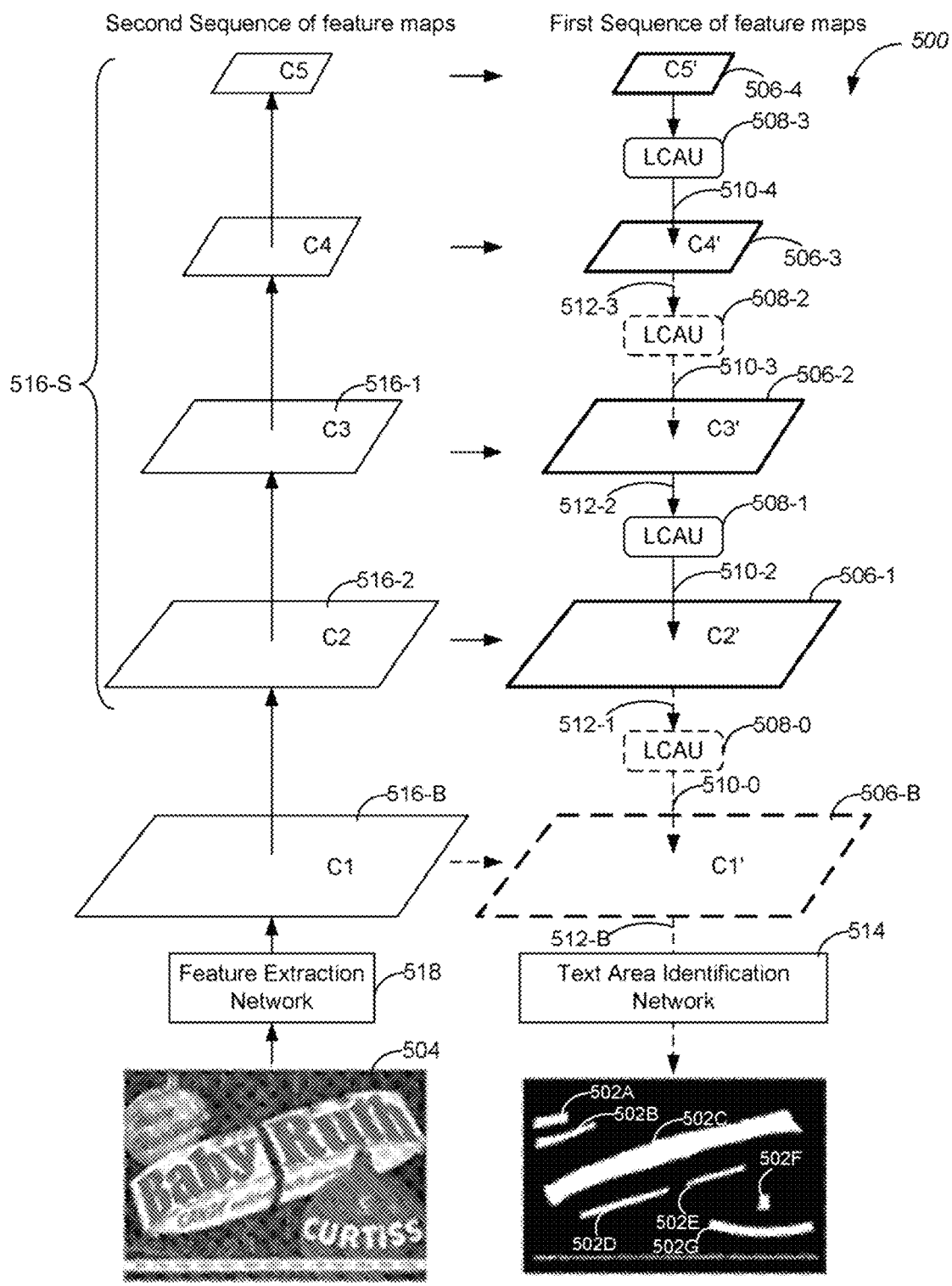
FIG. 5 is a flow diagram of an example text area identification process in which text areas are identified in an image, in accordance with some embodiments.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 224 for execution by the data processing system 200 (e.g., games, social network applications, smart home applications, and/or other web or non-web based applications for controlling another electronic device and reviewing data captured by such devices);
- Model training module 226 for receiving training data and establishing a data processing model for processing content data (e.g., video, image, audio, or textual data) to be collected or obtained by a client device 104;
- Data processing module 228 for processing content data using data processing models 240 (e.g., feature extraction network 518, LCAU networks 508, CNNs converting feature maps 516 to feature maps 506, and text area identification model 514 in FIG. 5), thereby identifying information contained in the content data, matching the content data with other data, categorizing the content data, or synthesizing related content data, where in some embodiments, the data processing module 228 is associated with one of the user applications 224 to process the content data in response to a user instruction received from the user application 224;
- One or more databases 230 for storing at least data including one or more of:
  - Device settings 232 including common device settings (e.g., service tier, device model, storage capacity, processing capabilities, communication capabilities, etc.) of the one or more servers 102 or client devices 104;
  - User account information 234 for the one or more user applications 224, e.g., user names, security questions, account history data, user preferences, and predefined account settings;
  - Network parameters 236 for the one or more communication networks 108, e.g., IP address, subnet mask, default gateway, DNS server and host name;
  - Training data 238 for training one or more data processing models 240;
  - Data processing model(s) 240 for processing content data (e.g., video, image, audio, or textual data) using deep learning techniques, where in some embodiments, the data processing models 240 includes a feature extraction network 518, LCAU networks 508, CNNs converting feature maps 516 to feature maps 506, and a text area identification model 514 in FIG. 5; and
  - Content data and results 242 that are obtained by and outputted to the client device 104 of the data processing system 200, respectively, where the content data is processed by the data processing models 240 locally at the client device 104 or remotely at the server 102 to provide the associated results 242 to be presented on client device 104.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
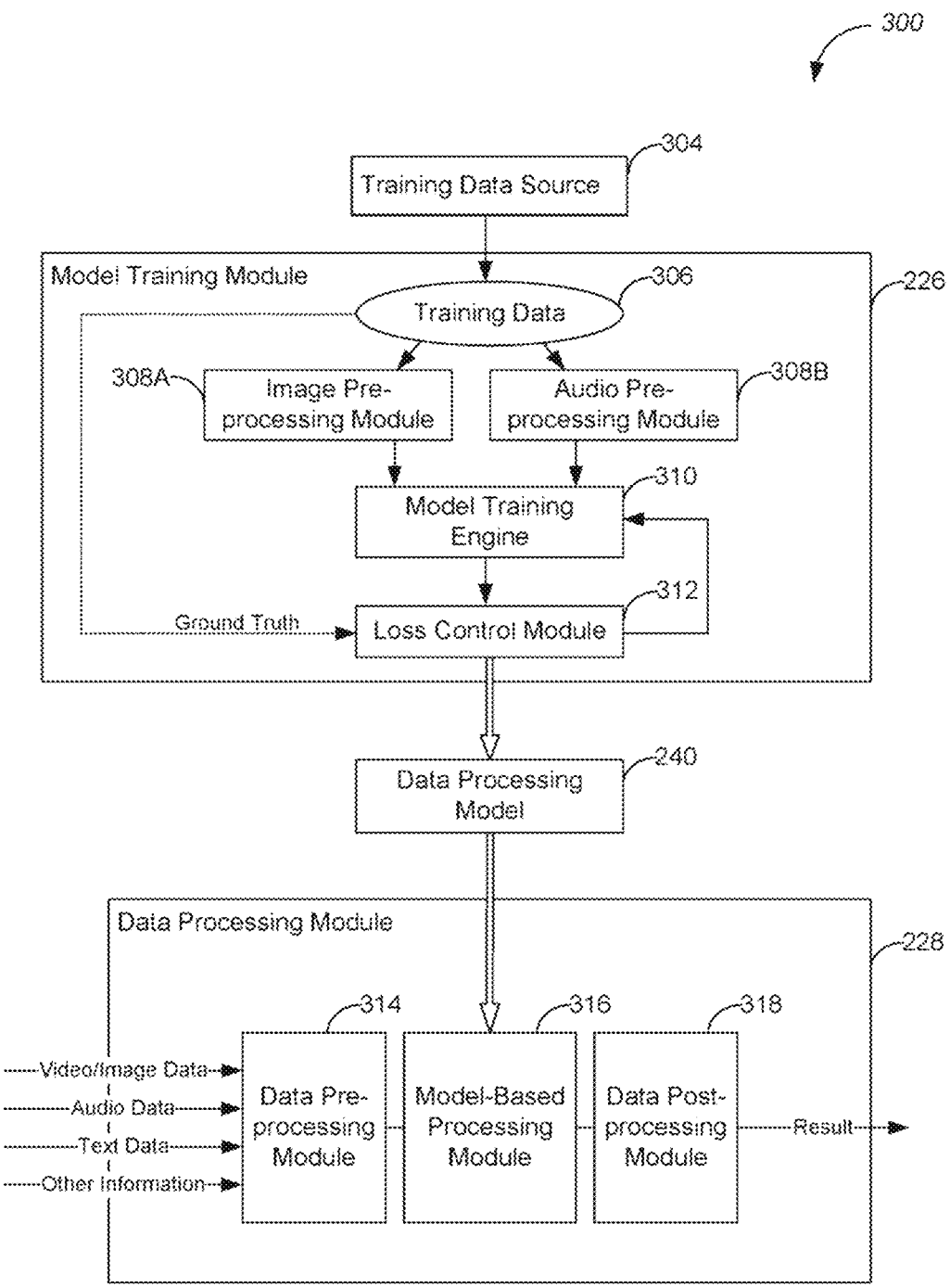
FIG. 3 is an example data processing environment for training and applying a neural network-based data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing module 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240. In some embodiments, the processed content data is further processed by the data post-processing module 318 to present the processed content data in a preferred format or to provide other related information that can be derived from the processed content data.

Figure 4A:
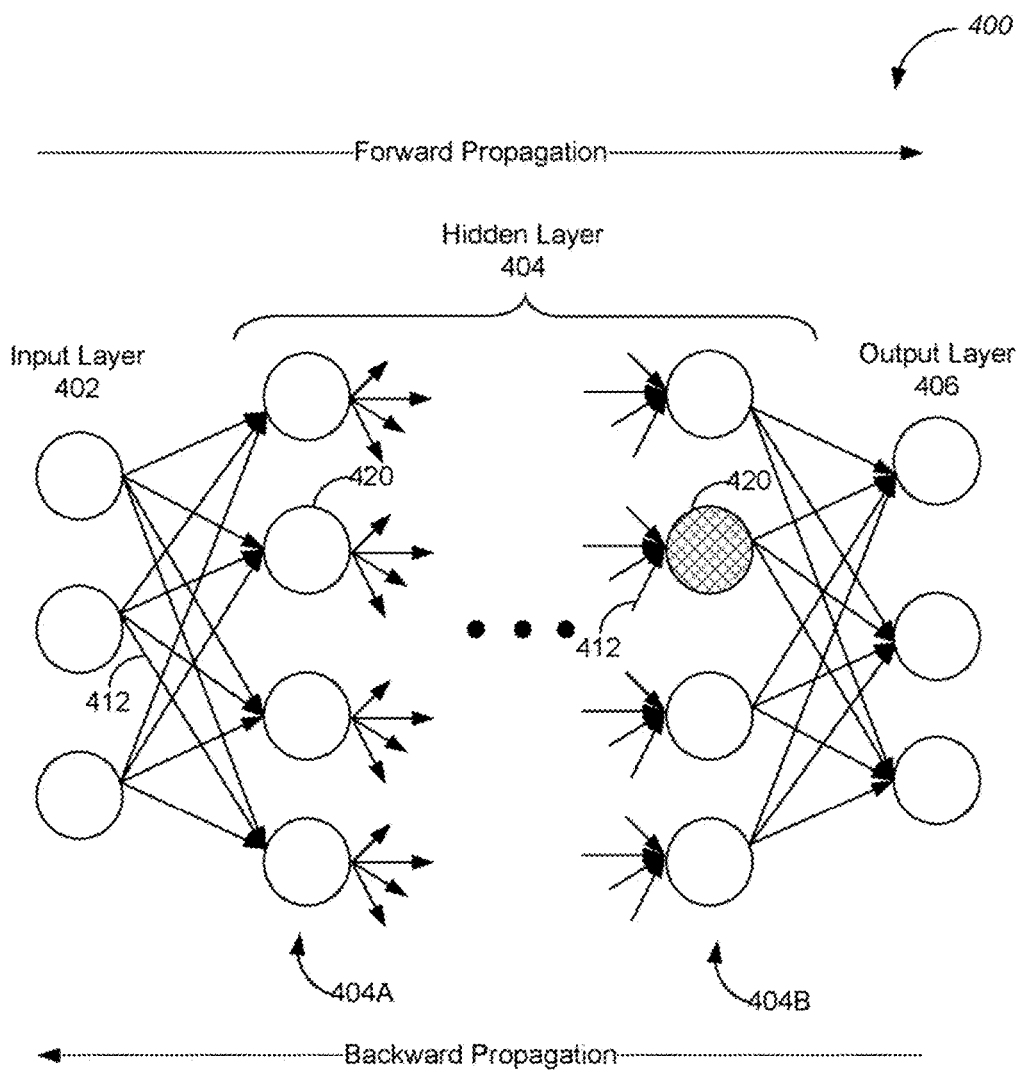
FIG. 4A is an example neural network applied to process content data in an NN-based data processing model, in accordance with some embodiments.
Figure 4B:
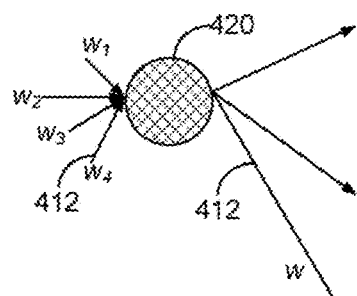
FIG. 4B is an example node in the neural network, in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240 is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w associated with each link 412 is applied to the node output. Likewise, the one or more node inputs are combined based on corresponding weights w1, w2, w3, and w4 according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

FIG. 5 is a flow diagram of an example text area identification process 500 in which text areas 502 (e.g., 502A-502G) are identified in an image 504, in accordance with some embodiments. The image 504 is captured by a camera, and the text area identification process 500 is implemented by a camera or a distinct electronic device in real time (e.g., with a latency less than a threshold latency, such as 30 milliseconds). The image 504 includes one or more text areas 502 each of which includes textual content. For example, the text areas 502A-502G includes "merry", "Christmas", "Baby Ruth", "CANDY", "enriched with dextrose", "C", and "CURTISS", respectively. In some embodiments, the image 504 is pre-processed before the image 504 is processed to extract the text areas 502. For example, the image 504 is flipped or rotated, e.g., with a rotational angle in a range of −10 degrees to 10 degrees. In some situations, the image 504 is scaled, e.g., with a scaling ratio in a range of [0.5, 3], and cropped to an image having a resolution of 640×640 pixels, e.g., during training.

A first sequence of feature maps 506 are generated from the image 504 based on a downsampling rate (e.g., 2). Each feature map 506 has a first dimension, a second dimension, and a third dimension. The first sequence of feature maps 506 include a first feature map 506-1 and a second feature map 506-2. Each of the first and second dimensions of the first feature map 506-1 having a respective size that is reduced to that of a respective dimension of the second feature map 506-2 by the downsampling rate. An upsampling rate matches the downsampling rate. In an example, the downsampling rate is 2, and the upsampling rate is 2. For the first or second dimension, the respective size of the first feature map 506-1 doubles the respective size of second feature map 506-2. In some embodiments, for the third dimension, the first feature map 506-1 has the same number of features as that of the second feature map 506-2. The second feature map 506-2 (specifically, the first and second dimensions of the second feature map 506-2) is upsampled by the upsampling rate using an LCAU network 508-1. An upsampled second feature map 510-2 is aggregated with the first feature map 506-1 to generate an aggregated first feature map 512-1. The one or more text areas 502 are identified in the image 504 based on the aggregated first feature map 512-1, e.g., using a text area identification network 514. Specifically, in some embodiments, the first and second dimensions of the aggregated first feature map 512-1 is upsampled by the upsampling rate, e.g., using the LCAU network 508-0. The one or more text areas 502 are identified in the image 504 based on the upsampled aggregated first feature map 510-0.

In some embodiments, the first sequence of feature maps include a third feature map 506-3. Each of the first and second dimensions of the second feature map 506-2 has a respective size that is reduced to that of a respective dimension of the third feature map 506-3 by the downsampling rate. Optionally, the third dimension of the second feature map 506-2 has the same number of features (e.g., 256 features) as that of the third feature map 506-3. The first and second dimensions of the third feature map 506-3 is upsampled by the upsampling rate using the LCAU network 508-2. The upsampled third feature map 510-3 is aggregated with the second feature map 506-2 to generate an aggregated second feature map 512-2. The second feature map 506-2 is updated with the aggregated second feature map 512-2, such that the aggregated second feature map 512-2 is upsampled using the LCAU network 508-1 and aggregated with the first feature map 506-1. The LCAU networks 508-1 and 508-2 are identical to each other. Further, in some embodiments, the first sequence of feature maps include a fourth feature map 506-4. Each of the first and second dimensions of the third feature map 506-3 has a respective size that is reduced to that of a respective dimension of the fourth feature map 506-4 by the downsampling rate. Optionally, the third dimension of the third feature map 506-3 has the same number of features (e.g., 256 features) as that of the fourth feature map 506-4. The first and second dimensions of the fourth feature map 506-4 is upsampled by the upsampling rate using the LCAU network 508-3. An upsampled fourth feature map 510-4 is aggregated with the third feature map 506-3 to generate an aggregated third feature map 512-3. The third feature map 506-3 is updated with the aggregated third feature map 512-3, such that the aggregated third feature map 512-3 is upsampled using the LCAU network 508-2 and aggregated with the second feature map 506-2. The LCAU networks 508-3 and 508-2 are identical to each other.

Alternatively, in some embodiments, the first sequence of feature maps 506 include a third feature map 506-3. Each of the first and second dimensions of the second feature map 506-2 has a respective size that is reduced to that of a respective dimension of the third feature map 506-3 by the downsampling rate. Optionally, the third dimension of the second feature map 506-2 has the same number of features (e.g., 256 features) as that of the third feature map 506-3. The third feature map 506-3 is not upsampled or aggregated with the second feature map 506-2.

In some embodiments, the image 504 is converted to a second sequence of feature maps 508 that are applied to generate the first sequence of feature maps 506. Each of the second sequence of feature maps 516 has the first, second, and third dimensions. Each of the first and second dimensions is downsampled successively in the second sequence of feature maps 516 by the downsampling rate (e.g., equal to 2). The third dimension is upsampled successively in the second sequence of feature maps by the upsampling rate (e.g., 2). The second sequence of feature maps 516 include one or more second base feature maps 516-B and a plurality of successive feature maps 516-S above the second base feature map(s) 516-B. Each of the plurality of successive feature maps 516-S is converted to a respective one of the first sequence of feature maps 506. For example, the plurality of successive feature maps 516-S includes a first feature map 516-1 and a second feature map 516-2. In the second sequence of feature maps 516, the first and second dimensions of the first feature map 516-1 are downsampled from the first and second dimensions of the second feature map 516-2 by the downsampling rate, and the third dimension of the first feature map 516-1 is optionally upsampled from the third dimension of the second feature map 516-2 by the upsampling rate corresponding to the downsampling rate. The first feature map 516-1 of the second sequence is converted to the first feature map 506-1 of the first sequence using a normalizing neural network (e.g., a CNN), so is the second feature map 516-2 of the second sequence converted to the second feature map 506-2 of the first sequence. The normalizing neural network keeps sizes of the first and second dimensions for each feature map and upsamples the third dimension to the same size, e.g., 256, such that the first sequence of feature maps 506 have the first and second dimensions gradually varying in size and the third dimension maintaining the same size.

In some embodiments, the second sequence of feature maps 516 form a pyramid and is generated from the image 504 using one of: ResNet-50, ResNet-101, MobileNet, and EfficientNet. Each of these networks is a backbone network configured to be deployed on a mobile device.

Referring to FIG. 5, in some embodiments, a backbone network is applied as a feature extraction network 518 to extract a plurality of feature map levels 516, e.g., 5 stages of feature maps C1, C2, C3, C4, C5. Each feature map $C_l$ has a downsampling rate of $2^l$ with respect to the image 504, where l represents an order of a respective feature map $C_l$ is the plurality of levels of feature maps. The plurality of levels of feature maps form a feature pyramid. The feature maps C2, C3, C4, C5 are selected for conversion, upsampling, and feature aggregation. In some situations, C1 is not selected for the purposes of reducing computational burden to the camera or electronic device that implements the text area identification process 500. During a feature aggregation stage, LCAU is applied for local context-aware upsampling, i.e., to model pixel-to-pixel relation in a local range on each feature map 506 and concatenate augmented feature maps C2', C3', C4', C5' to the feature map C2' with channel aggregation. An aggregated feature map 506-1 (C2') is upsampled to an original resolution of the image 504 to identify the one or more text areas 502 and predict text instances therein.

In one example, the second sequence of feature maps 516 include five feature maps C1-C5, and the example text area identification process 500 involves at least the plurality of successive feature maps 516-S above a second base feature map 516-B. Each of the plurality of successive feature maps 516-S is converted to a respective feature map 506, e.g., using a CNN. Each successive feature map 516-S has the same first size with the respective feature map 506 for the first dimension, and the same second size with the respective feature map 506 for the second dimension. The third dimension of the feature maps 506 are normalized to have a predefined number of features (e.g., 256 features). In the first sequence of feature maps, the fourth feature map 506-4 is upsampled and aggregated with the third feature map 506-4 to form the aggregated third feature map 512-3. The aggregated third feature map 512-3 is upsampled and aggregated with the second feature map 506-2 to form the aggregated second feature map 512-2. The aggregated second feature map 512-2 is upsampled and aggregated with the first feature map 506-1 to form the aggregated first feature map 512-1. The aggregated first feature map 512 is applied in the text area identification network 514 to identify the text areas 502. Each of the first sequence of feature maps 506 has a smaller dimension than that of the image 504, thereby facilitating implementation of the LCAU networks 508 and text area identification network 514 on electronic devices (e.g., a mobile device 104C) having a limited computational capability.

Conversely, in some embodiments, the computation capability is not strictly limited and can accommodate processing of images having large resolutions (e.g., exceeding a resolution threshold) and feature maps having large sizes (e.g., exceeding a dimension threshold). The aggregated first feature map 512-1 is upsampled and aggregated with the feature map 506-B converted from the base feature map 516-B to form the aggregated base feature map 512-B. The aggregated base feature map 512-B is applied in the text area identification network 514 to identify the text areas 502.

The feature extraction network 518, LCAU network 508, and text area identification network 514 are established based on deep learning techniques. In some embodiments, these networks 518, 508, and 514 are trained end-to-end. Alternatively, in some embodiments, each of these networks 518, 508, and 514 is trained individually. During training, dynamic text-spine labeling is applied, i.e., text-spine labels are enlarged gradually across different iterations during a training process. For a shrink ratio r, an initial shrink ratio $r_a$, and an end shrink ratio $r_b$. As the training process goes, the shrink ratio r is enlarged gradually as follows:

$$r = r_a + (r_b - r_a) \times \frac{\text{epoch}}{\text{max}_{epoch}} \qquad (1)$$

where an expansion coefficient is $$\frac{\text{epoch}}{\text{max}_{epoch}},$$

which is motivated by a poly learning rate delay policy. In an example of dynamic text-spine labelling, the shrink ratio r starts at 0.4, and increases to 0.8 gradually during successive iterations. For each image 504, a binary cross-entropy loss function with an example ratio of positive and negative samples as 1:3 is applied:

$$L = \sum_{i=0}^{n} y_i \log(x_i) + (1 - y_i)\log(1 - x_i) \qquad (2)$$

where the training image has n pixels, i represents each pixel, $y_i$ is equal to 1 at a pixel corresponding to a ground truth text area and 0 at a pixel corresponding to a background, and $x_i$ is in a predefined range of [0, 1] for a pixel in each identified training text area. For example, a probability value $x_i$ is equal to 0 indicating the respective pixel has no probability of corresponding to a text area 502, and 1 indicating that the probability of the respective pixel corresponding to a text area 502 is 100%.

Figure 6A:
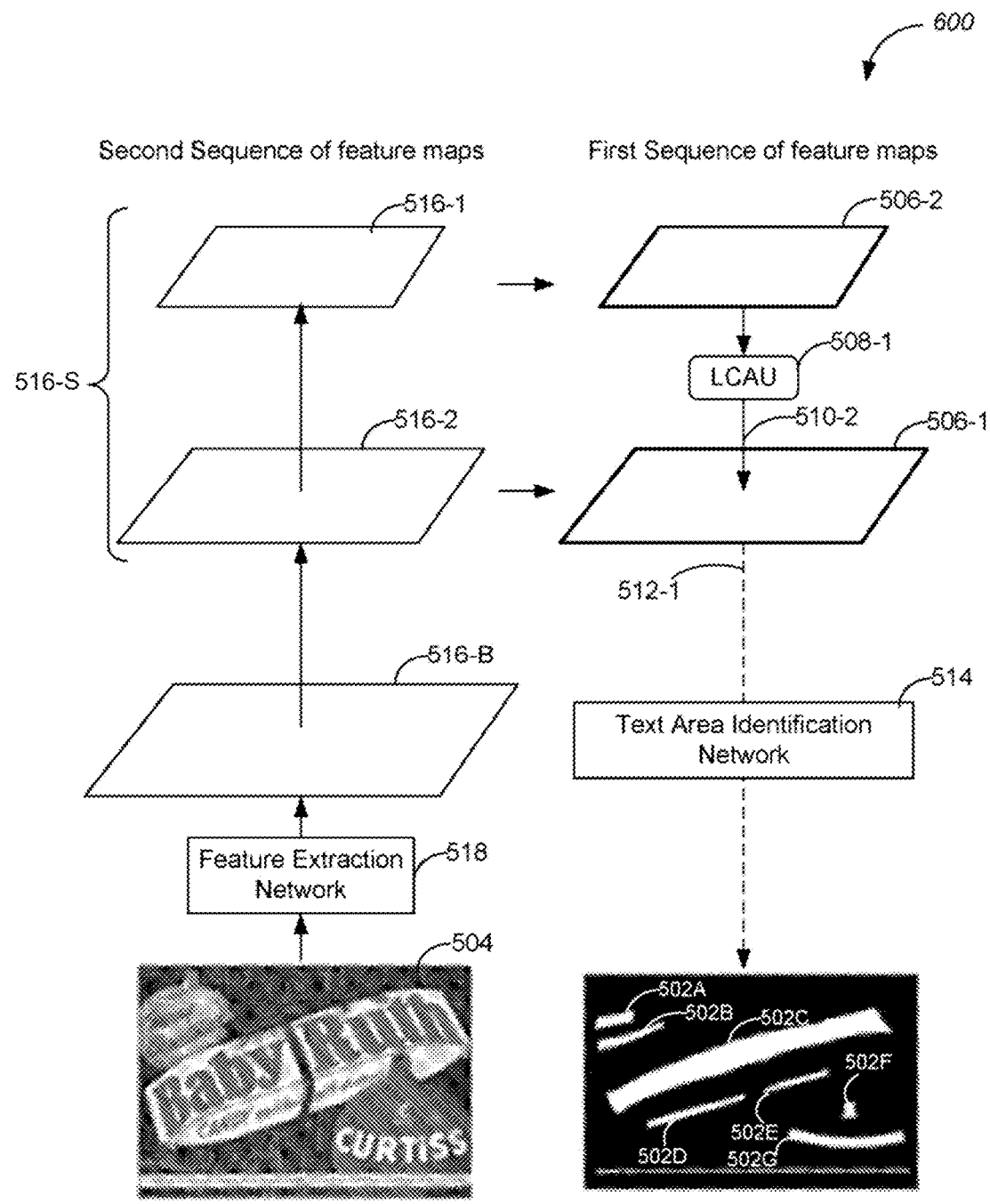
FIGS. 6A and 6B are flow diagrams of two example simplified text area identification processes in which text areas are identified in an image, in accordance with some embodiments.
Figure 6B:
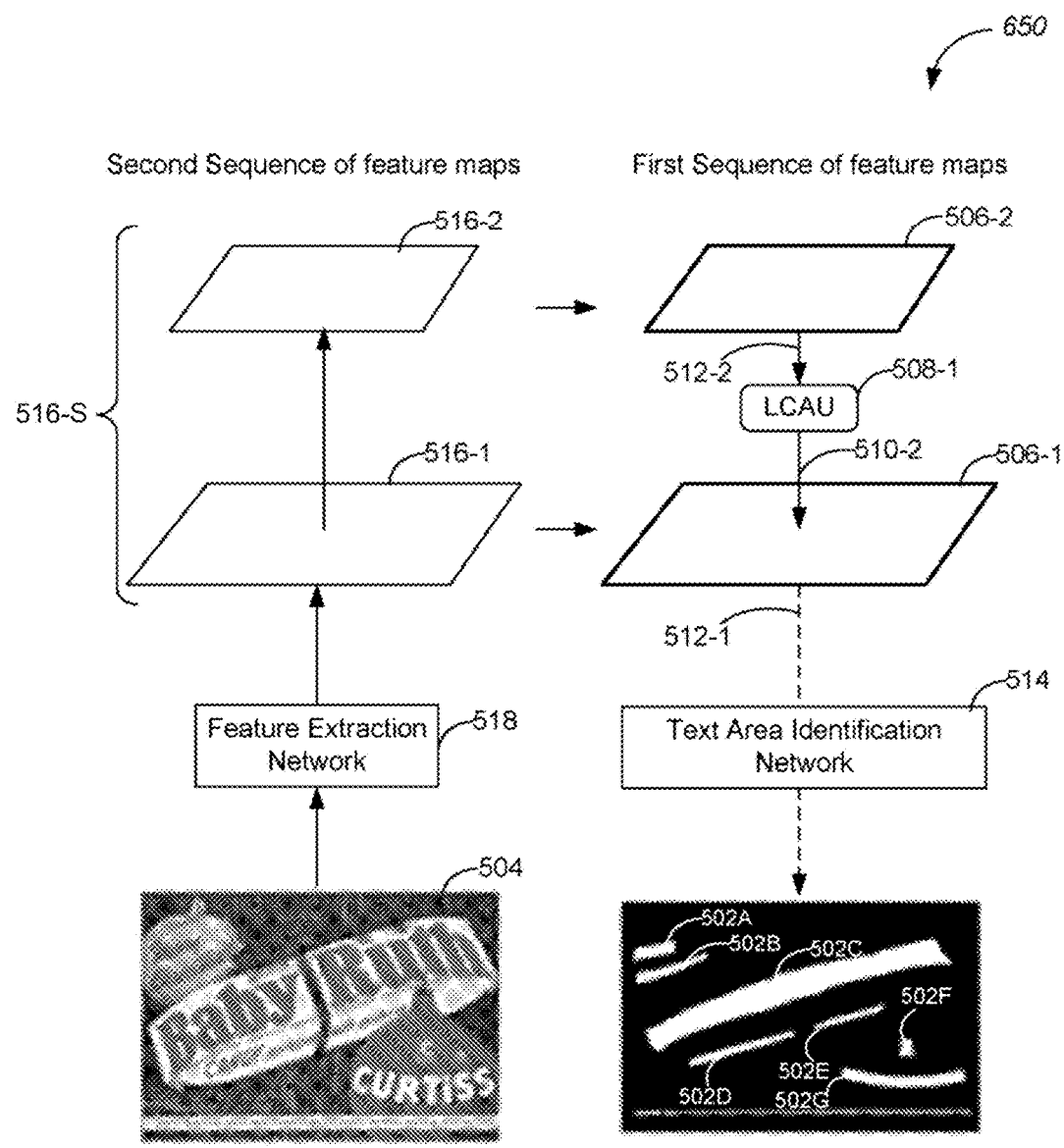

FIGS. 6A and 6B are flow diagrams of two example simplified text area identification processes 600 and 650 in which text areas are identified in an image, in accordance with some embodiments. Only one LCAU network 508 is applied during the course of identifying text areas in an image 504. A first sequence of feature maps 506 are generated from the image 504 based on a downsampling rate (e.g., 2), and has only a first feature map 506-1 and a second feature map 506-2. Each feature map 506 has a first dimension, a second dimension, and a third dimension. Each of the first and second dimensions of the first feature map 506-1 having a respective size that is reduced to that of a respective dimension of the second feature map 506-2 by the downsampling rate. An upsampling rate matches the downsampling rate. In an example, the downsampling rate is 2, and the upsampling rate is 2. For the first or second dimension, the respective size of the first feature map 506-1 doubles the respective size of second feature map 506-2. In some embodiments, for the third dimension, the first feature map 506-1 has the same number of features as that of the second feature map 506-2. The second feature map 506-2 (specifically, the first and second dimensions of the second feature map 506-2) is upsampled by the upsampling rate using an LCAU network 508-1. The upsampled second feature map 510-2 is aggregated with the first feature map 506-1 to generate an aggregated first feature map 512-1. The one or more text areas 502 are identified in the image 504 based on the aggregated first feature map 512-1, e.g., using a text area identification network 514.

The image 504 is converted to a second sequence of feature maps 508, a subset of the first sequence of feature maps 508 is further converted to generate the first sequence of feature maps 506. Referring to FIG. 6A, in some embodiments, the second sequence of feature maps 516 include one or more second base feature maps 516-B and two successive feature maps 516-S above the second base feature map(s) 516-B. Each of the two successive feature maps 516-S is converted to a respective one of the first sequence of feature maps 506 using a normalizing neural network (e.g., a CNN). Stated another way, the two successive feature maps 516-S are converted to the second sequence of feature maps 506, while the one or more second base feature maps 516-B are not converted. In one example, there is only one second base feature map 516-B. In another example, there are two second base feature maps 516-B. If the image 504 has a predefined resolution 640×640, both a size of the first feature map 506-1 and a complexity level of the text area identification network 514 increase with a decrease of a number of second base feature maps 516-B. Application of two or more second base feature maps 516-B expedites a text area identification process 600 compared with application of a single second base feature map 516-B, and makes text area identification in real time with capturing the image 504. In some embodiments, given that a resolution of the first feature map 506-1 is downsampled more than once, an accuracy level of the text area 502 is compromised.

Referring to FIG. 6B, in some embodiments, the second sequence of feature maps 516 do not include any second base feature maps 516-B and includes two successive feature maps 516-S, i.e., a first feature map 516-1 and a second feature map 516-2. The first feature map 506-1 is converted from the first feature map 516-1, and the second feature map 506-2 is converted from the second feature map 516-2. Each of the first and second dimensions is downsampled from the first feature map 516-1 to the second feature map 516-2 by the downsampling rate (e.g., equal to 2). The third dimension is upsampled from the first feature map 516-1 to the second feature map 516-2 by the upsampling rate (e.g., 2). Each of the two successive feature maps 516-S is converted to a respective one of the first sequence of feature maps 506 using a normalizing neural network (e.g., a CNN). The first feature map 516-1 of the second sequence is converted to the first feature map 506-1 of the first sequence using the normalizing neural network (e.g., a CNN), so is the second feature map 516-2 of the second sequence converted to the second feature map 506-2 of the first sequence. The normalizing neural network keeps sizes of the first and second dimensions for each feature map and upsamples the third dimension to the same size, e.g., 256, such that the first sequence of feature maps 506 have the first and second dimensions gradually varying in size and the third dimension maintaining the same size.

In an example, the image 504 has a resolution, e.g., 640×640 pixels. The sizes of the first and second dimensions of the first feature maps 506-1 and 516-1 match the resolution of the image 504, e.g., correspond to 640×640 features. The sizes of the first and second dimensions of the second feature maps 506-2 and 516-2 are downsampled by the downsampling rate from the sizes of the first feature maps 506-1 and 51601 and the resolution of the image 504, e.g., correspond to 320×320 features when the downsampling rate is equal to 2. Referring to FIG. 6B, the one or more text areas 502 are identified in the image 504 based on the aggregated first feature map 512-1, e.g., using a text area identification network 514. The text area identification network 514 has a size that matches that of the first feature map 506-1 that further matches the resolution of the image 504. In some embodiments related to FIG. 6B, the first sequence of feature maps 506 include three or more feature maps every two of which are combined using an LCAU network 508. As such, an accuracy level of text area identification benefits from local context-aware upsampling, while a size of the text area identification network 514 does not need to be reduced.

Figure 7:
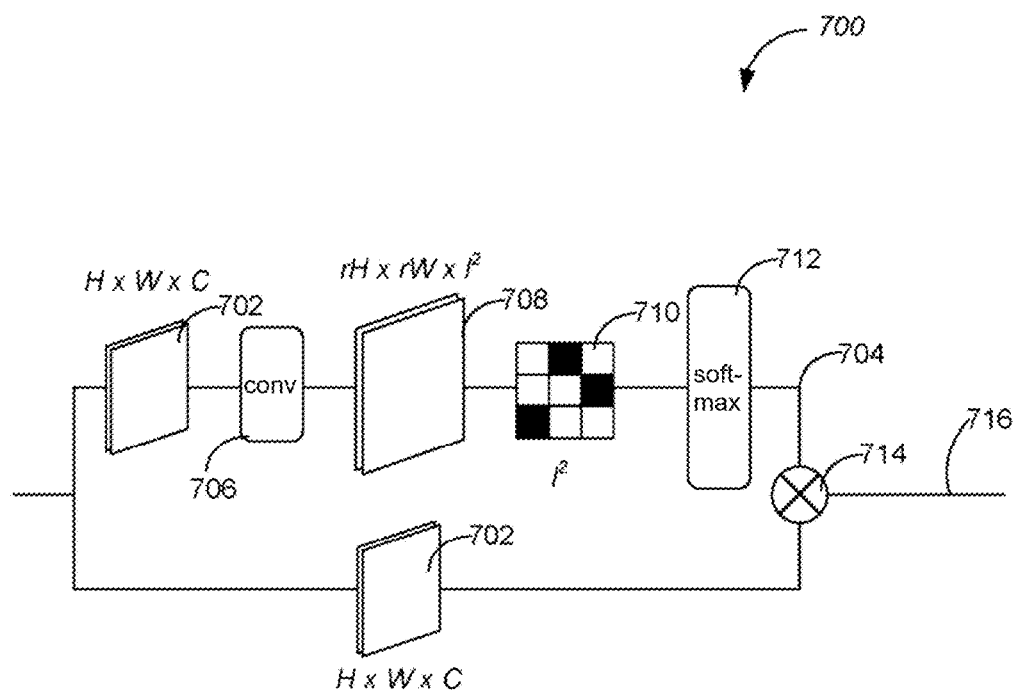
FIG. 7 is a block diagram of an example local context-aware upsampling network, in accordance with some embodiments.

FIG. 7 is a block diagram of an example local context-aware upsampling (LCAU) network 508, in accordance with some embodiments. An input feature map 702 has three dimensions including H, W, and C elements, respectively. On a reshape branch, an upsampling operation converts the input feature map 702 to a normalized intermediate feature map 704 having three dimensions including rH, rW, and C elements, respectively, where r is an upsampling rate, C is equal to $r^2 l^2$, and/is a receptive field of pixels on the input feature map 702 (H×W×C). Specifically, a convolution layer 706 has a dimension 3×3×H×W, and enables a pixel shuffle operation 706 with the upsampling rate r to generate an intermediate feature map 708 having dimensions of rH×rW× $l^2$. On a depth channel, $l^2$ can be viewed as weight matrix 710 of coordinate (x, y) on the intermediate feature map 708 (rH×rW×$l^2$). For dynamic filtering, a softmax function 712 is applied to normalize the weight matrix 710, i.e., a third dimension of the intermediate feature map 708. A local context-aware matrix multiplication 714 further combines the normalized intermediate feature map 704 with the input feature map 702 (H×W×C). After the multiplication 714, a resulting feature map 716 has dimensions of rH×rW×C. Such local context-aware upsampling can replace any upsampling operation with no or little computation burden.

The input feature map 702 (e.g., the second feature map 506-2 in FIG. 5) is upsampled by the upsampling rate r using the LACU network 508. An intermediate feature map 708 is generated from the input feature map 702, e.g., using a CNN 706. Each of the first and second dimensions of the second feature map 506-2 is upsampled to a respective dimension of the intermediate feature map 708 by the upsampling rate r. The third dimension of the second feature map 506-2 has a different size from and is projected into the third dimension of the intermediate feature map 708. The third dimension of the intermediate feature map 708 includes a weight matrix 710 that is further normalized using a softmax function 712, thereby generating a normalized intermediate feature map 704. The normalized intermediate feature map 704 is combined (714) with the input feature map 702 (e.g., the second feature map 506-2 in FIG. 5) to obtain an upsampled input feature map 716 (e.g., the upsampled second feature map 510-2 in FIG. 5). During such an LACU-based upsampling process, the weight matrix 710 is generated to weaken non-textual context surrounding any text areas, allowing an accuracy of text area identification to be enhanced without demanding a significant level of computation resources. By these means, LACU enables real-time text area identification and text recognition from the image 504.

Figure 8A:
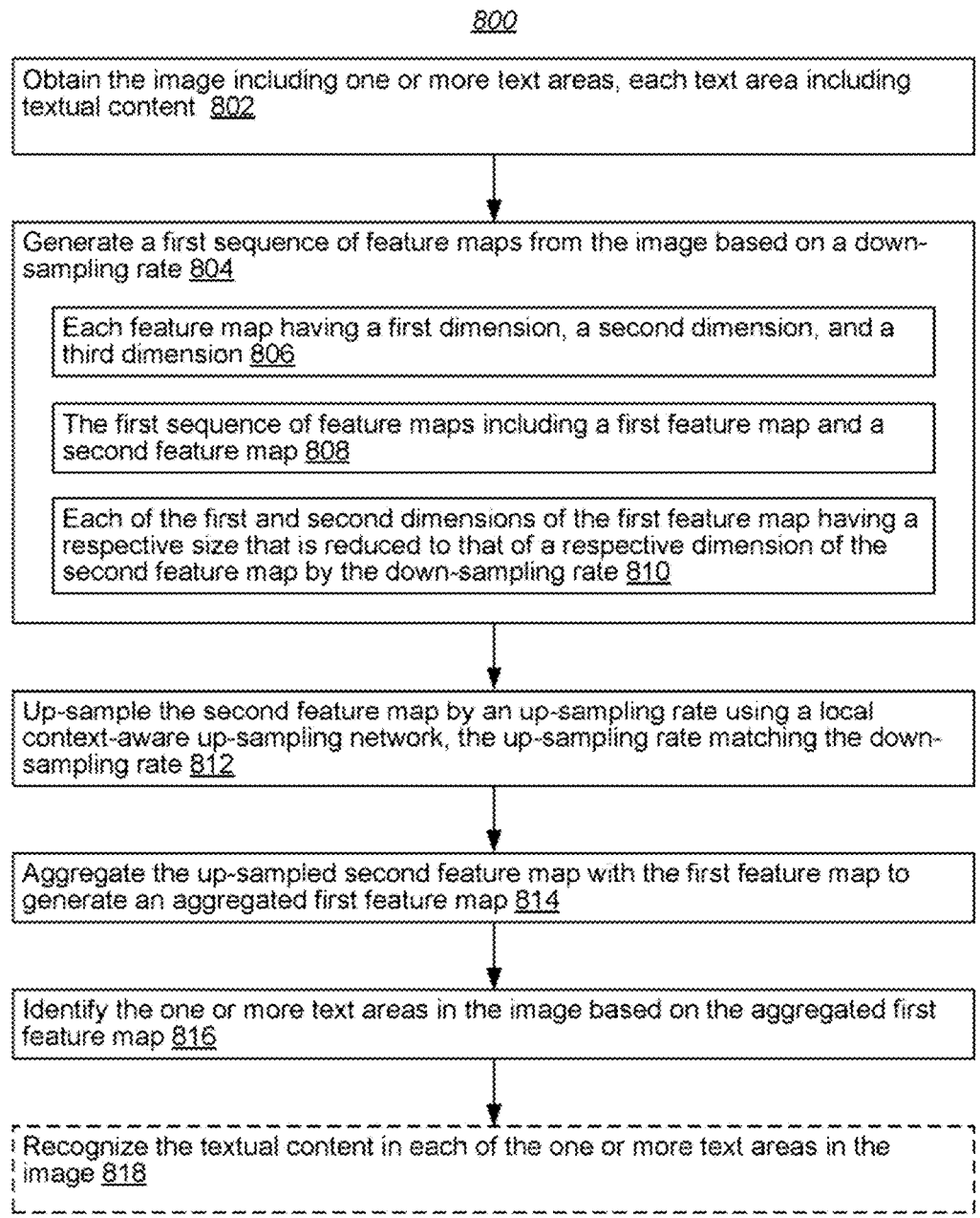
FIGS. 8A and 8B are flowcharts of two methods for identifying text areas in an image captured by a camera, in accordance with some embodiments.
Figure 8B:
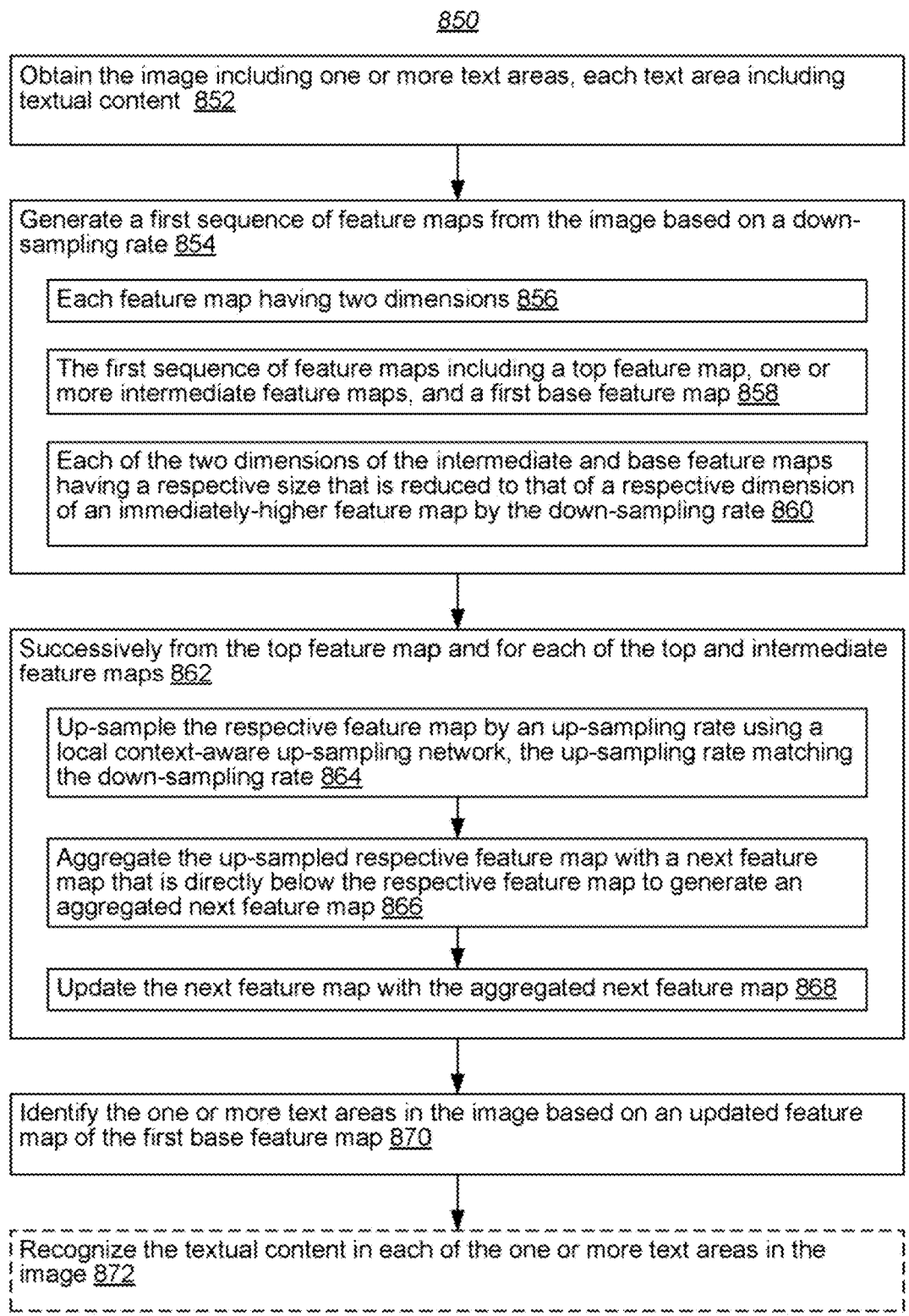

FIGS. 8A and 8B are two flowcharts of methods 800 and 850 for identifying text areas in an image captured by a camera, in accordance with some embodiments. For convenience, each of the methods 800 and 850 is described as being implemented by a computer system (e.g., a client device 104, a server 102, or a combination thereof). An example of the client device 104 is a mobile phone 104C or AR glasses 104D. Each of the methods 800 and 850 is, optionally, governed by instructions that are stored in a non-transitory computer readable storage medium and that are executed by one or more processors of the computer system. Each of the operations shown in FIGS. 8A and 8B may correspond to instructions stored in a computer memory or non-transitory computer readable storage medium (e.g., memory 206 of the computer system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in each of the methods 800 and 850 may be combined and/or the order of some operations may be changed.

Referring to FIG. 8A, the computer system obtains (802) an image 504 including one or more text areas 502. Each text area 502 includes textual content. The computer system generates (804) a first sequence of feature maps from the image 504 based on a downsampling rate. Each feature map (806) has a first dimension, a second dimension, and a third dimension. The first sequence of feature maps include (808) a first feature map 506-1 and a second feature map 506-2. Each of the first and second dimensions of the first feature map 506-1 has (810) a respective size that is reduced to that of a respective dimension of the second feature map 506-2 by the downsampling rate. Optionally, the third dimension of the first feature map 506-1 has the same number of features as that of the second feature map 506-2.

The computer system upsamples (812) the second feature map 506-2 by an upsampling rate using a local context-aware upsampling network 508. The upsampling rate matches the downsampling rate, and aggregates (814) the upsampled second feature map 510-2 with the first feature map 506-1 to generate an aggregated first feature map 512-1. The one or more text areas 502 are identified (816) in the image 504 based on the aggregated first feature map 512-1. In some embodiments, the textual content is recognized (818) in each of the one or more text areas 502 in the image 504.

Further, in some embodiments, the first sequence of feature maps 506 include a third feature map 506-3, and each of the first and second dimensions of the second feature map 506-2 has a respective size that is reduced to that of a respective dimension of the third feature map 506-3 by the downsampling rate. Optionally, the third dimension of the second feature map 506-2 has the same number of features as that of the third feature map 506-3. The computer system upsamples the first and second dimensions of the third feature map 506-3 by the upsampling rate using the local context-aware upsampling network 508-2, and aggregating the upsampled third feature map 510-3 with the second feature map 506-2 to generate an aggregated second feature map 512-2. The second feature map 506-2 is updated with the aggregated second feature map 512-2, such that the aggregated second feature map 512-2 is upsampled using the local context-aware upsampling network 508-1 and aggregated with the first feature map 506-1.

Additionally, in some embodiments the first sequence of feature maps 506 further include a fourth feature map 506-4, and each of the first and second dimensions of the third feature map 506-3 has a respective size that is reduced to that of a respective dimension of the fourth feature map 506-4 by the downsampling rate. Optionally, the third dimension of the third feature map 506-3 has the same number of features as that of the fourth feature map 506-4. The computer system upsamples the first and second dimensions of the fourth feature map 506-4 by the upsampling rate using the local context-aware upsampling network 508-3, and aggregates the upsampled fourth feature map 510-4 with the third feature map 506-3 to generate an aggregated third feature map 512-3. The third feature map 506-3 is updated with the aggregated third feature map 512-3, such that the aggregated third feature map 512-3 is upsampled using the local context-aware upsampling network 508-2 and aggregated with the second feature map 506-2. In an example, the second sequence of feature maps 516 include 5 feature maps. The downsampling rate and the upsampling rate are equal to 2. The third dimension of each of the first sequence of feature maps has 256 features.

In some embodiments, for local context-aware upsampling (LCAU), the computer system generates an intermediate feature map 708 from the second feature map 506-2. Each of the first and second dimensions of the second feature map 506-2 is upsampled to a respective dimension of the intermediate feature map by the upsampling rate. The third dimension of the second feature map 506-2 has a different size from and being projected into the third dimension of the intermediate feature map 708. The third dimension of the intermediate feature map 708 is normalized, e.g., using a softmax function 712. The normalized intermediate feature map 704 is combined with the second feature map 506-2 to generate the upsampled second feature map 510-2.

In some embodiments, the first sequence of feature maps include a third feature map 506-3. Each of the first and second dimensions of the second feature map 506-2 has a respective size that is reduced to that of a respective dimension of the third feature map by the downsampling rate. Optionally, the third dimension of the third feature map 506-3 has the same number of features as that of the second feature map 506-2. The third feature map 506-3 is not upsampled or aggregated with the second feature map 506-2.

In some embodiments, for identifying the one or more text areas 502 in the image 504, the computer system upsamples the first and second dimensions of the aggregated first feature map 512-1 by the upsampling rate using the local context-aware upsampling network 508-0, and identifies the one or more text areas 502 in the image 504 based on the upsampled aggregated first feature map 510-0.

In some embodiments, a second sequence of feature maps 516 are generated from the image 504 based on the downsampling rate. Each of the second sequence of feature maps 516 has the first, second, and third dimensions. Each of the first and second dimensions is downsampled successively in the second sequence of feature maps 515 by the downsampling rate. The third dimension is upsampled successively in the second sequence of feature maps 516 by the upsampling rate. The second sequence of feature maps 516 include a second base feature map 516-B and a plurality of successive feature maps 516-S above the second base feature map 516-B. The computer system converts each of the plurality of successive feature maps 516-S to a respective one of the first sequence of feature maps 506. Further, in some embodiments, the second sequence of feature maps 516 are generated from the image 504 using one of: ResNet-50, ResNet-101, MobileNet, and EfficientNet.

In some embodiments, the computer system obtains a training image and one or more ground truth text areas associated with the training image. The first sequence of feature maps are generated using a feature map generation network (e.g., including the feature extraction network 518 and CNNs converting the second sequence of feature maps 516 to the first sequence of feature maps 506). The one or more text areas 502 are identified in the image 504 based on the aggregated first feature map 512-1 using a text area identification network 514. One or more training text areas are identified from the training image using the feature map generation network, local context-aware upsampling network 508, and text area identification network 514. The feature map generation network, local context-aware upsampling network, and text area identification network are iteratively trained in an end-to-end manner based on a binary cross-entropy loss function $L=\Sigma_{i=0}^{n} y_i \log (x_i)+(1-y_i) \log (1-x_i)$, where the training image has n pixels, i represents each pixel, $y_i$ is equal to 1 at a pixel corresponding to a ground truth text area and 0 at a pixel corresponding to a background, and $x_i$ is in a predefined range of [0, 1] for a pixel in each identified training text area.

Further, in some embodiments, during two consecutive training iterations, an area of each training text area is iteratively shrunk according to a shrink ratio r, and the shrink ratio r increases in a predefined range with training iterations.

Referring to FIG. 8B, the computer system obtains (852) the image 504 including one or more text areas 502. Each text area 502 includes textual content. The computer system generates (854) a first sequence of feature maps 516 from the image 504 based on a downsampling rate. Each feature map has (856) two dimensions. The first sequence of feature maps include (858) a top feature map (e.g., 506-4 in FIG. 5), one or more intermediate feature maps (e.g., 506-2, and 506-3 in FIG. 5), and a first base feature map (e.g., 506-B or 506-1 in FIG. 5). Each of the two dimensions of the intermediate and base feature maps has (860) a respective size that is reduced to that of a respective dimension of an immediately-higher feature map by the downsampling rate. The third dimension is upsampled to have a fixed number of features, e.g., 256 features. Successively from the top feature map and for each of the top and intermediate feature maps (862), the computer system upsamples (864) the respective feature map 506 by an upsampling rate using a local context-aware upsampling network 508, aggregates (866) the upsampled respective feature map 510 with a next feature map that is directly below the respective feature map to generate an aggregated next feature map, and updates (868) the next feature map with the aggregated next feature map. The one or more text areas 502 are identified (870) in the image 504 based on an updated feature map of the first base feature map (e.g., 506-1 or 506-B in FIG. 5). In some embodiments, the textual content is recognized (872) in each of the one or more text areas 502 in the image 504.

In some embodiments, a second sequence of feature maps 516 are generated from the image 504 based on the downsampling rate. Each of the two dimensions is downsampled successively in the second sequence of feature maps by the downsampling rate. A third dimension is upsampled successively in the second sequence of feature maps by the upsampling rate. The second sequence of feature maps 516 include a second base feature map 516-B and a plurality of successive feature maps 516-S above the second base feature map 516-B. Each of the successive feature maps 516-S in the second sequence of feature maps 516 is converted to a respective one of the first sequence of feature maps 506, while keeping sizes of the two dimensions of the respective feature map.

It should be understood that the particular order in which the operations in each of the methods 800 and 850 have been described are merely exemplary and are not intended to indicate that the described order is the only order in which the operations could be performed. One of ordinary skill in the art would recognize various ways to identify text areas 502 in an image 504 as described herein. Additionally, it should be noted that details of other processes described above with respect to FIGS. 5-7 are also applicable in an analogous manner to each of the methods 800 and 850 described above with respect to FIG. 8A or 8B. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for identifying text areas in an image, comprising:
    obtaining the image including one or more text areas, each text area including textual content;
    generating a first sequence of feature maps from the image based on a downsampling rate, each feature map having a first dimension, a second dimension, and a third dimension, the first sequence of feature maps including a first feature map and a second feature map, each of the first and second dimensions of the first feature map having a respective size that is reduced to that of a respective dimension of the second feature map by the downsampling rate;
    upsampling the second feature map by an upsampling rate using a local context-aware upsampling network, the upsampling rate matching the downsampling rate, wherein the local context-aware upsampling network computes locally on the second feature map;
    aggregating the upsampled second feature map with the first feature map to generate an aggregated first feature map; and
    identifying the one or more text areas in the image based on the aggregated first feature map.

2. The method of claim 1, wherein upsampling the second feature map by the upsampling rate using the local context-aware upsampling network comprises:
    generating an intermediate feature map from the second feature map, each of the first and second dimensions of the second feature map being upsampled to a respective dimension of the intermediate feature map by the upsampling rate, the third dimension of the second feature map having a different size from and being projected into the third dimension of the intermediate feature map;
    normalizing the third dimension of the intermediate feature map; and
    combining the second feature map and the normalized intermediate feature map to generate the upsampled second feature map.

3. The method of claim 1, wherein the first sequence of feature maps include a third feature map, each of the first and second dimensions of the second feature map has a respective size that is reduced to that of a respective dimension of the third feature map by the downsampling rate, and the method further comprises:
    upsampling the first and second dimensions of the third feature map by the upsampling rate using the local context-aware upsampling network;
    aggregating the upsampled third feature map with the second feature map to generate an aggregated second feature map; and
    updating the second feature map with the aggregated second feature map, such that the aggregated second feature map is upsampled using the local context-aware upsampling network and aggregated with the first feature map.

4. The method of claim 3, wherein the first sequence of feature maps further include a fourth feature map, each of the first and second dimensions of the third feature map has a respective size that is reduced to that of a respective dimension of the fourth feature map by the downsampling rate, and the method further comprising:
    upsampling the first and second dimensions of the fourth feature map by the upsampling rate using the local context-aware upsampling network;
    aggregating the upsampled fourth feature map with the third feature map to generate an aggregated third feature map; and
    updating the third feature map with the aggregated third feature map, such that the aggregated third feature map is upsampled using the local context-aware upsampling network and aggregated with the second feature map.

5. The method of claim 1, wherein:
    the first sequence of feature maps include a third feature map;
    each of the first and second dimensions of the second feature map has a respective size that is reduced to that of a respective dimension of the third feature map by the downsampling rate; and
    the third feature map is not upsampled or aggregated with the second feature map.

6. The method of claim 1, identifying the one or more text areas in the image based on the aggregated first feature map comprising:
    upsampling the first and second dimensions of the aggregated first feature map by the upsampling rate; and
    identifying the one or more text areas in the image based on the upsampled aggregated first feature map.

7. The method of claim 1, generating the first sequence of feature maps comprising:

generating a second sequence of feature maps from the image based on the downsampling rate, each of the second sequence of feature maps having the first, second, and third dimensions, each of the first and second dimensions being downsampled successively in the second sequence of feature maps by the downsampling rate, the third dimension being upsampled successively in the second sequence of feature maps by the upsampling rate, the second sequence of feature maps including a second base feature map and a plurality of successive feature maps above the second base feature map; and converting each of the plurality of successive feature maps to a respective one of the first sequence of feature maps.

8. The method of claim 7, wherein the second sequence of feature maps are generated from the image using one of: ResNet-50, ResNet-101, MobileNet, and EfficientNet.

9. The method of claim 7, wherein:

the second sequence of feature maps include 5 feature maps;

the downsampling rate and the upsampling rate are each 2; and the third dimension of each of the first sequence of feature maps has the same size and has 256 features.

10. The method of claim 1, further comprising:

recognizing the textual content in each of the one or more text areas in the image.

11. The method of claim 1, wherein the method is implemented at a mobile device.

12. The method of claim 1, further comprising:

obtaining a training image and one or more ground truth text areas associated with the training image, wherein the first sequence of feature maps are generated using a feature map generation network, and the one or more text areas are identified in the image based on the aggregated first feature map using a text area identification network;

identifying one or more training text areas from the training image using the feature map generation network, local context-aware upsampling network, and text area identification network; and iteratively training the feature map generation network, local context-aware upsampling network, and text area identification network in an end-to-end manner based on a binary cross-entropy loss function as follows:

$$L = \sum_{i=0}^{n} y_i \log(x_i) + (1 - y_i)\log(1 - x_i)$$

wherein the training image has n pixels, i represents each pixel, $y_i$ is equal to 1 at a pixel corresponding to a ground truth text area and 0 at a pixel corresponding to a background, and $x_i$ is in a predefined range of [0, 1] for a pixel in each identified training text area.

13. The method of claim 12, wherein during two consecutive training iterations, an area of each training text area is iteratively shrunk according to a shrink ratio $r_a$, and the shrink ratio $r_a$ increases in a predefined range with training iterations.

14. A method for identifying text areas in an image, comprising:

obtaining the image including one or more text areas, each text area including textual content;

generating a first sequence of feature maps from the image based on a downsampling rate, each feature map having two dimensions, the first sequence of feature maps including a top feature map, one or more intermediate feature maps, and a first base feature map, each of the two dimensions of the intermediate and base feature maps having a respective size that is reduced to that of a respective dimension of an immediately-higher feature map by the downsampling rate;

successively from the top feature map and for each of the top and intermediate feature maps:

upsampling the respective feature map by an upsampling rate using a local context-aware upsampling network, the upsampling rate matching the downsampling rate, wherein the local context-aware upsampling network computes locally on the respective feature map;

aggregating the upsampled respective feature map with a next feature map that is directly below the respective feature map to generate an aggregated next feature map; and updating the next feature map with the aggregated next feature map; and identifying the one or more text areas in the image based on an updated feature map of the first base feature map.

15. The method of claim 14, generating the first sequence of feature maps comprising:

generating a second sequence of feature maps from the image based on the downsampling rate, each of the two dimensions being downsampled successively in the second sequence of feature maps by the downsampling rate, the second sequence of feature maps including a second base feature map and a plurality of successive feature maps above the second base feature map; and converting each of the successive feature maps in the second sequence of feature maps to a respective one of the first sequence of feature maps while keeping sizes of the two dimensions of the respective feature map.

16. A computer system, comprising:

one or more processors; and a memory having instructions stored thereon, which when executed by the one or more processors cause the one or more processors to:

obtain an image including one or more text areas, each text area including textual content;

generate a first sequence of feature maps from the image based on a downsampling rate, each feature map having a first dimension, a second dimension, and a third dimension, the first sequence of feature maps including a first feature map and a second feature map, each of the first and second dimensions of the first feature map having a respective size that is reduced to that of a respective dimension of the second feature map by the downsampling rate;

upsample the second feature map by an upsampling rate using a local context-aware upsampling network, the upsampling rate matching the downsampling rate, wherein the local context-aware upsampling network computes locally on the second feature map;

aggregate the upsampled second feature map with the first feature map to generate an aggregated first feature map; and identify the one or more text areas in the image based on the aggregated first feature map.

17. The computer system of claim 16, wherein the one or more processors configured to upsample the second feature map by the upsampling rate using the local context-aware upsampling network are configured to:
    generate an intermediate feature map from the second feature map, each of the first and second dimensions of the second feature map being upsampled to a respective dimension of the intermediate feature map by the upsampling rate, the third dimension of the second feature map having a different size from and being projected into the third dimension of the intermediate feature map;
    normalize the third dimension of the intermediate feature map; and
    combine the second feature map and the normalized intermediate feature map to generate the upsampled second feature map.

18. The computer system of claim 16, wherein the first sequence of feature maps include a third feature map, each of the first and second dimensions of the second feature map has a respective size that is reduced to that of a respective dimension of the third feature map by the downsampling rate, and the one or more processors are further configured to:
    upsample the first and second dimensions of the third feature map by the upsampling rate using the local context-aware upsampling network;
    aggregate the upsampled third feature map with the second feature map to generate an aggregated second feature map; and
    update the second feature map with the aggregated second feature map, such that the aggregated second feature map is upsampled using the local context-aware upsampling network and aggregated with the first feature map.

19. The computer system of claim 18, wherein the first sequence of feature maps further include a fourth feature map, each of the first and second dimensions of the third feature map has a respective size that is reduced to that of a respective dimension of the fourth feature map by the downsampling rate, and the one or more processors are further configured to:
    upsample the first and second dimensions of the fourth feature map by the upsampling rate using the local context-aware upsampling network;
    aggregate the upsampled fourth feature map with the third feature map to generate an aggregated third feature map; and
    update the third feature map with the aggregated third feature map, such that the aggregated third feature map is upsampled using the local context-aware upsampling network and aggregated with the second feature map.

20. The computer system of claim 16, where the one or more processors configured to identify the one or more text areas in the image based on the aggregated first feature map are configured to:
    upsample the first and second dimensions of the aggregated first feature map by the upsampling rate; and
    identify the one or more text areas in the image based on the upsampled aggregated first feature map.

\* \* \* \* \*